(12) United States Patent
Tamamidis

(10) Patent No.: US 8,756,923 B2
(45) Date of Patent: Jun. 24, 2014

(54) MIXING PIPE FOR SCR MUFFLERS

(75) Inventor: Panos Tamamidis, Mount Prospect, IL (US)

(73) Assignee: CNH Industrial America LLC, New Holland, PA (US)

( * ) Notice: Subject to any disclaimer, the term of this patent is extended or adjusted under 35 U.S.C. 154(b) by 312 days.

(21) Appl. No.: 12/954,000

(22) Filed: Nov. 24, 2010

(65) Prior Publication Data

US 2012/0124968 A1    May 24, 2012

(51) Int. Cl.
*F01N 3/10* (2006.01)

(52) U.S. Cl.
USPC ............ 60/299; 60/322; 60/324; 181/251; 181/257; 239/599

(58) Field of Classification Search
USPC ............ 60/274–324; 181/251, 257, 268, 275, 181/239, 269, 274; 239/265.11–265.13, 239/266–269, 590.5–601; 169/14, 15
See application file for complete search history.

(56) References Cited

U.S. PATENT DOCUMENTS

| | | | | |
|---|---|---|---|---|
| 2,229,913 | A | * | 1/1941 | Blanchard ...................... 181/268 |
| 3,649,213 | A | | 3/1972 | De Palma et al. |
| 3,879,943 | A | | 4/1975 | Konig |
| 3,912,460 | A | * | 10/1975 | McGann ........................ 422/143 |
| 3,954,417 | A | | 5/1976 | Jalbing |
| 3,995,712 | A | * | 12/1976 | Leistritz et al. ............... 181/230 |
| 4,209,493 | A | | 6/1980 | Olson |
| 4,223,843 | A | * | 9/1980 | Smith et al. .................... 239/558 |
| 4,443,551 | A | * | 4/1984 | Lionetti et al. .................. 502/41 |
| 4,702,891 | A | | 10/1987 | Li et al. |
| 4,866,932 | A | * | 9/1989 | Morita et al. .................... 60/288 |
| 5,065,576 | A | | 11/1991 | Kanazawa et al. |
| 5,426,269 | A | * | 6/1995 | Wagner et al. ................ 181/232 |
| 5,685,143 | A | | 11/1997 | Aitta et al. |
| 5,934,069 | A | | 8/1999 | Hertl et al. |
| 6,391,267 | B1 | * | 5/2002 | Martin et al. .................. 422/173 |
| 6,609,590 | B2 | * | 8/2003 | Zelinski ......................... 181/281 |
| 6,712,869 | B2 | | 3/2004 | Cheng et al. |
| 6,745,562 | B2 | | 6/2004 | Berriman et al. |
| 6,912,843 | B2 | * | 7/2005 | Hufendiek et al. ............. 60/282 |
| 7,028,468 | B2 | * | 4/2006 | Brown et al. ................... 60/299 |
| 7,198,763 | B2 | | 4/2007 | Holm-Christensen |
| 7,762,374 | B2 | * | 7/2010 | Turner et al. .................. 181/239 |
| 7,975,382 | B2 | * | 7/2011 | Brandt et al. .............. 29/890.08 |
| 2004/0261404 | A1 | * | 12/2004 | Vignassa et al. ................ 60/324 |
| 2007/0169467 | A1 | * | 7/2007 | Shirai et al. ..................... 60/286 |
| 2008/0066448 | A1 | * | 3/2008 | Halbei et al. .................... 60/282 |
| 2008/0216470 | A1 | | 9/2008 | Sedlacek et al. |
| 2009/0235653 | A1 | | 9/2009 | Mital et al. |

FOREIGN PATENT DOCUMENTS

DE    102008031136    1/2010

* cited by examiner

*Primary Examiner* — Jesse Bogue
(74) *Attorney, Agent, or Firm* — Sue C. Watson

(57) ABSTRACT

An apparatus for treating exhaust includes a housing having an inlet and an outlet, the housing defining a chamber. The inlet is in fluid communication with a source of exhaust. A mixing tube is connected to the inlet. The mixing tube has at least two branches and a plurality of apertures defined in a wall of the mixing tube. A substrate is disposed between the mixing tube and the outlet. The at least two branches converge at an end section of the mixing tube to form a mixing loop.

18 Claims, 4 Drawing Sheets

MIXING PIPE FOR SCR MUFFLERS

TECHNOLOGY FIELD

The present invention relates generally to exhaust treatment systems for internal combustion engines, and more particularly, but not exclusively, to selective catalytic reduction mufflers.

BACKGROUND

The Environmental Protection Agency is working aggressively to reduce pollution in automobiles and heavy-duty diesel trucks and buses. One device used to reduce pollutants is as a catalytic converter. Catalytic converters reduce pollution by enhancing the conversion rate of pollutants, such as nitrous oxides ("NOx"), into harmless gases, such as nitrogen and water vapor. One type of device that uses a catalytic converter is a selective catalytic reduction ("SCR") muffler.

One example of a SCR muffler is disclosed in U.S. Patent Application Publication Number 2008/0216470 to Sedlacek et al. ("the '470 Publication"). The '470 Publication discloses an exhaust aftertreatment system. Exhaust flows from an engine to an aftertreatment system, such as a SCR muffler. The exhaust is pre-treated with urea before entering the aftertreatment system. The aftertreatment system includes a straight pipe inlet disposed laterally across a chamber. The exhaust gas flows laterally into the straight pipe inlet and out axially through perforations in the pipe wall. The exhaust gas then passes over a catalytic substrate that converts some of the exhaust gases (e.g., NOx) into harmless gases.

A problem with the system disclosed in the '470 patent is that urea does not adequately convert into ammonia and ammonia does not adequately mix with the exhaust gas, which leads to an unoptimized gas mixture and a non-uniform gas distribution across the surface of the catalyst. An unoptimized gas mixture and non-uniform gas distribution reduces the effectiveness of the catalytic reactions, allowing an increased concentration of pollutants (e.g., NOx) to escape to the atmosphere. Therefore, what is needed is an exhaust treatment system that can provide a more optimized gas mixture and distribution across the surface of a catalyst.

SUMMARY

Embodiments of the present invention address and overcome one or more of the above shortcomings and drawbacks, by providing devices, systems, and methods for treating exhaust. This technology is particularly well-suited for, but by no means limited to, SCR mufflers.

According to an aspect of the invention, the invention includes an apparatus for treating exhaust. The apparatus includes a housing having a side wall, a top wall, and a bottom wall. The housing has an inlet and an outlet. The inlet is in fluid communication with a source of exhaust gas. The outlet is in fluid communication with atmosphere. A mixing chamber in the housing is in fluid communication with the inlet. A substrate chamber in the housing is in fluid communication with the mixing chamber. An outlet chamber in the housing is in fluid communication with the substrate chamber and the outlet. A mixing loop having at least two branches is connected to the inlet and extends into the mixing chamber. The mixing loop has a plurality of apertures defined in a wall of the mixing loop.

The apertures can be substantially evenly distributed or unevenly distributed in the wall of the mixing loop. The apertures can be substantially the same size or can vary in size.

In some embodiments, the mixing loop includes an end section that connects distal ends of the at least two branches of the mixing loop. In some embodiments, the end section is closed and does not include apertures. In some embodiments, the end section has a plurality of apertures defined in a wall of the end section.

In some embodiments, the mixing loop has a third branch connected to the inlet and extending into the mixing chamber. In some embodiments, the mixing loop has a closed end section. In some embodiments, the mixing loop has an end section having a plurality of apertures defined in a wall of the end section. An insulating material can be disposed between the side wall and an outer wall.

In some embodiments, the apparatus includes an exhaust pipe connected to the outlet of the housing. A portion of the exhaust pipe can extend into the outlet chamber. A perforated plate can be connected to the exhaust pipe and the side wall. In some embodiments, the portion of the exhaust pipe extending into the outlet chamber includes a plurality of apertures defined in a wall of the exhaust pipe.

According to another aspect of the invention, the invention includes an apparatus for treating exhaust. The apparatus includes a housing defining a chamber, the housing having an inlet and an outlet. The inlet is in fluid communication with a source of exhaust. A mixing tube is connected to the inlet and has at least two branches and a plurality of apertures defined in a wall of the mixing tube. The at least two branches of the mixing tube are connected at an end section. A substrate is disposed between the mixing tube and the outlet.

In some embodiments, the at least two branches of the mixing tube form a mixing loop. The mixing loop can be substantially ovular. The apertures can be evenly distributed in the wall of the mixing loop. In some embodiments, the mixing loop has a closed end section (i.e., no apertures). In some embodiments, the mixing loop has an end section having a plurality of apertures defined in a wall of the end section. In some embodiments, the apparatus includes a mixing chamber in fluid communication with the inlet, the mixing tube extending into the mixing chamber.

According to another aspect of the invention, the invention includes a method of treating exhaust. The method includes receiving exhaust through an inlet in a housing. The method also includes splitting the exhaust into at least two branches. The method further includes converging the exhaust from the at least two branches in an end section to form mixed exhaust. The method also includes reacting the mixed exhaust along a surface of a substrate to form treated exhaust.

In some embodiments, the method includes passing the mixed exhaust, through apertures in the at least two branches, into a mixing chamber. In some embodiments, the method includes forming a loop of exhaust from the at least two branches.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The above problems in the prior art have motivated the creation of an apparatus that can more uniformly mix and distribute exhaust gas across a surface of a substrate (e.g., a catalytic substrate). The present invention is directed to embodiments of an apparatus for treating exhaust. The apparatus includes a mixing loop having at least two branches. Exhaust entering a first branch converges and/or collides with exhaust entering the second branch at an end section of the mixing loop. This convergence and/or collision can enhance the production of a pre-treatment substance (e.g., the production of ammonia from urea) and mixing of exhaust gases with the pre-treatment substance (e.g., ammonia), which can result in more efficient reactions at the substrate surface to reduce the concentration of pollutants in the exhaust.

Apertures are defined in a wall of the mixing loop to permit the mixed gas to escape into a mixing chamber and to flow across a surface of the substrate. The apertures are configured to substantially uniformly distribute the mixed gas across the surface of a substrate. The substantially uniform distribution of mixed gas across the substrate surface can result in more efficient reactions at the substrate surface to reduce the concentration of pollutants.

We now turn to the figures for a more complete understanding of exemplary embodiments of the invention.

Figure 1:
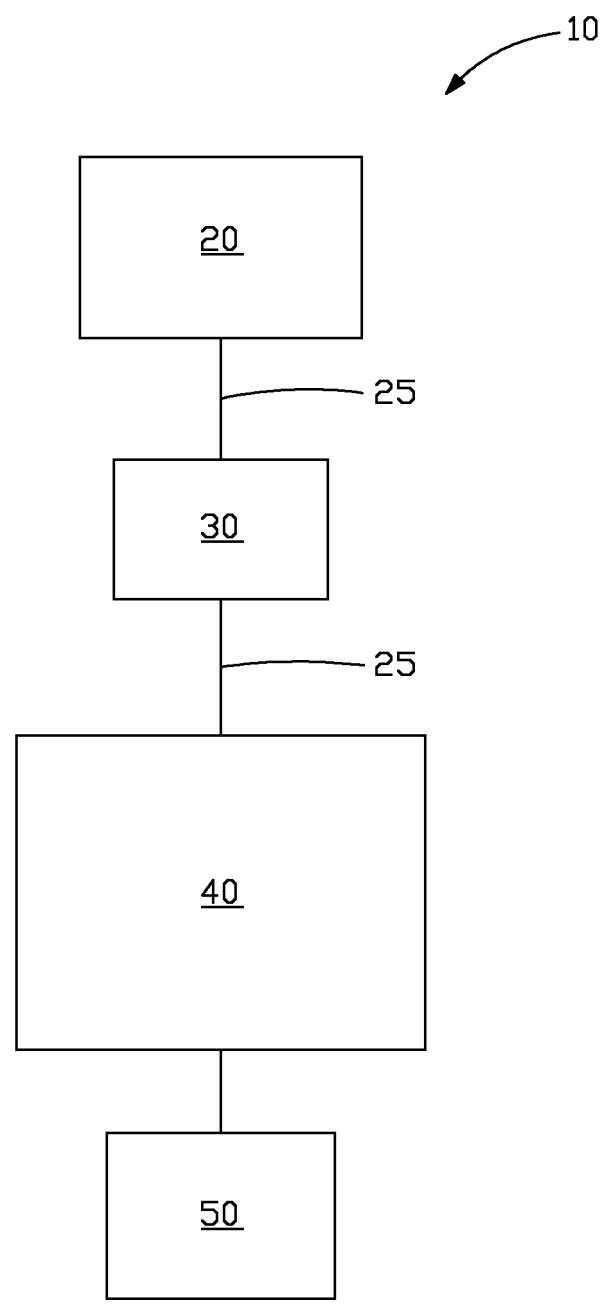
FIG. 1 is a schematic view of an exhaust system.

FIG. 1 is a schematic view of an exhaust system. As shown in FIG. 1, an exhaust system 10 includes an engine 20, an injector 30, an exhaust treatment device 40, and a vent to atmosphere 50. The engine 20 can be an internal combustion engine, such as a gasoline engine (e.g., an automobile engine) or a diesel engine (e.g., a truck or heavy machine engine). Exhaust from the engine 20 flows through a manifold (not shown) to an outlet pipe 25 that fluidly connects the engine 20 with the exhaust treatment device 40. The exhaust includes pollutants, such as hydrocarbons, NOx, CO2, and/or sulfur oxides ("SOx"). The exhaust can be at an elevated temperature (e.g., 750-1,000° F.). The injector 30 introduces a pre-treatment component into the outlet pipe 25 to react and/or mix with the exhaust gas to create pre-treated exhaust. The exhaust treatment device 40 then converts the pretreated exhaust to a treated exhaust that has a reduced concentration of pollutants (e.g., NOx).

In some embodiments, the injector 30 introduces (e.g., atomizes) a urea-water solution (e.g., hydroform of urea) into the outlet pipe 25. The urea-water solution can evaporate, due to the heat from the exhaust, to produce urea and water vapor. Subsequently, urea can decompose into ammonia and isocyanic acid, in a reaction called thermolysis. Isocyanic acid can further react with water vapor to produce more ammonia and carbon dioxide. These reactions are well known in the art. Although urea is atomized by the injector 30 to enhance the mixing and/or reaction with the exhaust, not all of the urea can react to form ammonia due to size and space constraints of the exhaust system 10. Accordingly, the pre-treated exhaust gases can include, among many components, NOx, SOx, evaporated ammonia, and liquid un-decomposed urea in the form of droplets. The pre-treated exhaust then passes through the exhaust treatment device 40 which, in some embodiments, is a SCR muffler. The SCR muffler includes a catalyst that enhances the reaction between ammonia and NOx to reduce the NOx concentration of the treated exhaust that flows through the vent to atmosphere 50.

Figure 2:
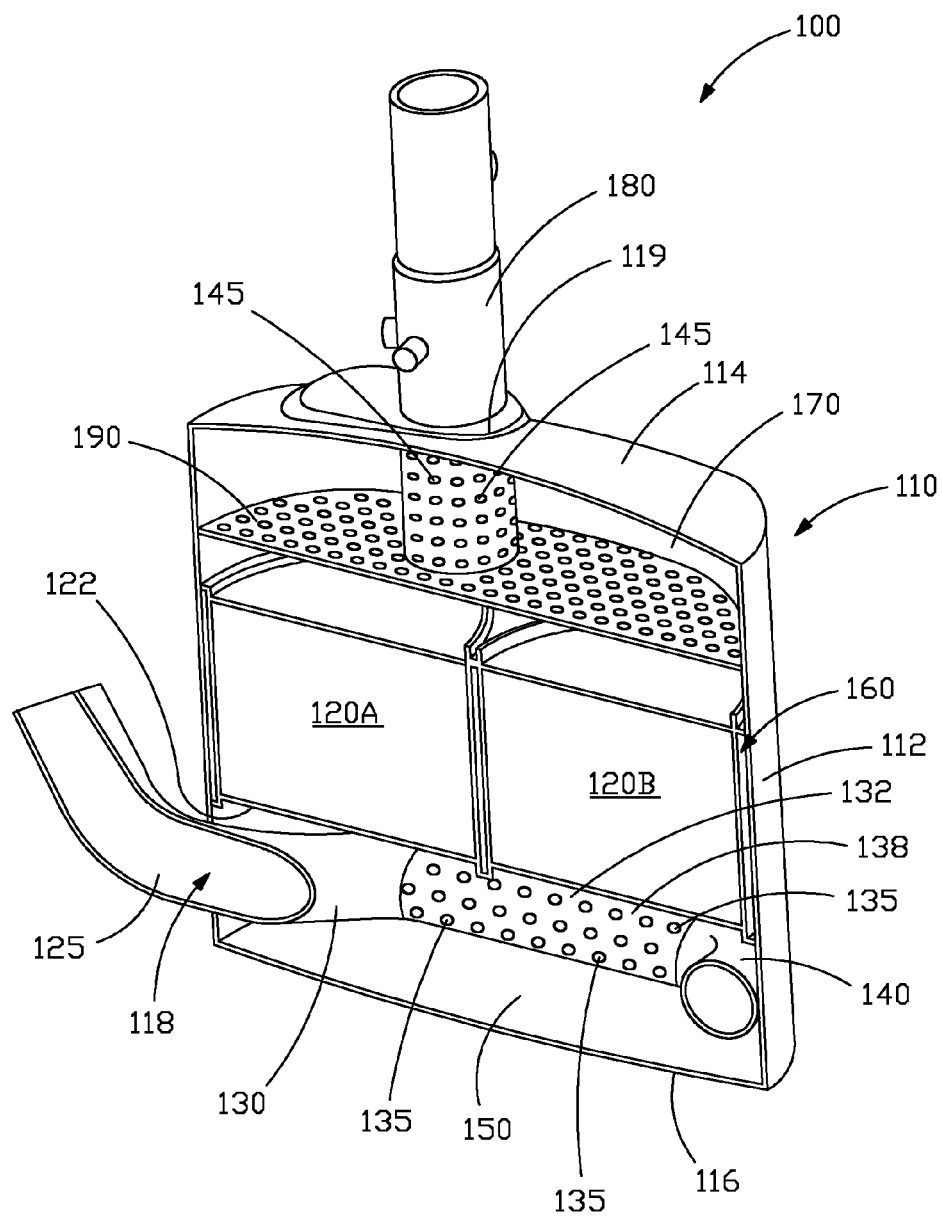
FIG. 2 is a cross-sectional view of a SCR muffler according to an aspect of the invention.

FIG. 2 is a cross-sectional view of a SCR muffler according to an aspect of the invention. As shown in FIG. 2, the SCR muffler 100 includes a housing 110, substrates 120A and 120B, an inlet pipe 125, a mixing tube 130, and an exhaust pipe 180. The housing 110 includes a side wall 112, a top wall 114, a bottom wall 116, an inlet 118, and an outlet 119. The housing 110 can be formed out of a metal or a metal alloy, for example, steel, stainless steel, or other similar materials. The inlet pipe 125 is in fluid communication with an engine (e.g., the engine 20 in FIG. 1) and the mixing tube 130. The inlet pipe 125 passes through the inlet 118 defined in the sidewall 112 of the housing 110. In some embodiments, the inlet 118 can be defined in the bottom wall 116 of the housing 110. The mixing tube 130 is disposed in a mixing chamber 150 that is defined by the bottom wall 116, the lower edge 122 of substrates 120A and 120B, and a lower portion of the sidewall 112.

The mixing tube 130 includes a first branch 132 and a second branch (not shown). The first branch 132 and the second branch can form a mixing loop, which can be ovular, circular, rectangular, symmetric, asymmetric, or any other shape or configuration that creates a loop. An end section 140 can join the first branch 132 and the second branch of the mixing tube 130 to form the mixing loop. A plurality of apertures 135 is defined in a wall 138 of the mixing tube 130. As shown, the mixing tube 130 is located in the mixing chamber 150.

The substrates 120A and 120B are disposed in a substrate chamber 160 that is in fluid communication with the mixing chamber 150 and an outlet chamber 170. The substrates 120A and 120B can each include an active component and, in some embodiments, a carrier component. The active component is exposed to the exhaust gases and can be a catalytic material (e.g., platinum, palladium, rhodium, and/or vanadium) that is adapted to enhance the rate of the chemical reaction between NOx and ammonia. The catalytically-enhanced reactions between NOx and ammonia, generally referred to as the "NOx reactions," are well known in the art. The carrier component (e.g., a ceramic) can be used as a base material to support the active component. The substrates 120A and 120B can have the same or different active and/or carrier components. In some embodiments, the substrates 120A and 120B can be replaced by a single substrate. In other embodiments, three or more substrates can be disposed in the substrate chamber 160.

The outlet chamber 170 is disposed between the substrate chamber 160 and the top wall 114 of the housing 110. The exhaust pipe 180 passes through the outlet 119 defined in the top wall 114 of the housing 110. In some embodiments, the outlet 119 can be defined in the sidewall 112 of the housing 110. In some embodiments, the exhaust pipe 180 does not extend into the outlet chamber 170. The exhaust pipe 180 includes optional apertures 145 to receive exhaust gas. An optional perforated plate 190 can connect to the exhaust pipe 180 and the sidewall 112. The perforated plate 190 can be formed out of a rigid material (e.g., steel and/or stainless steel) and can provide structural support for the exhaust pipe 180.

Figure 3:
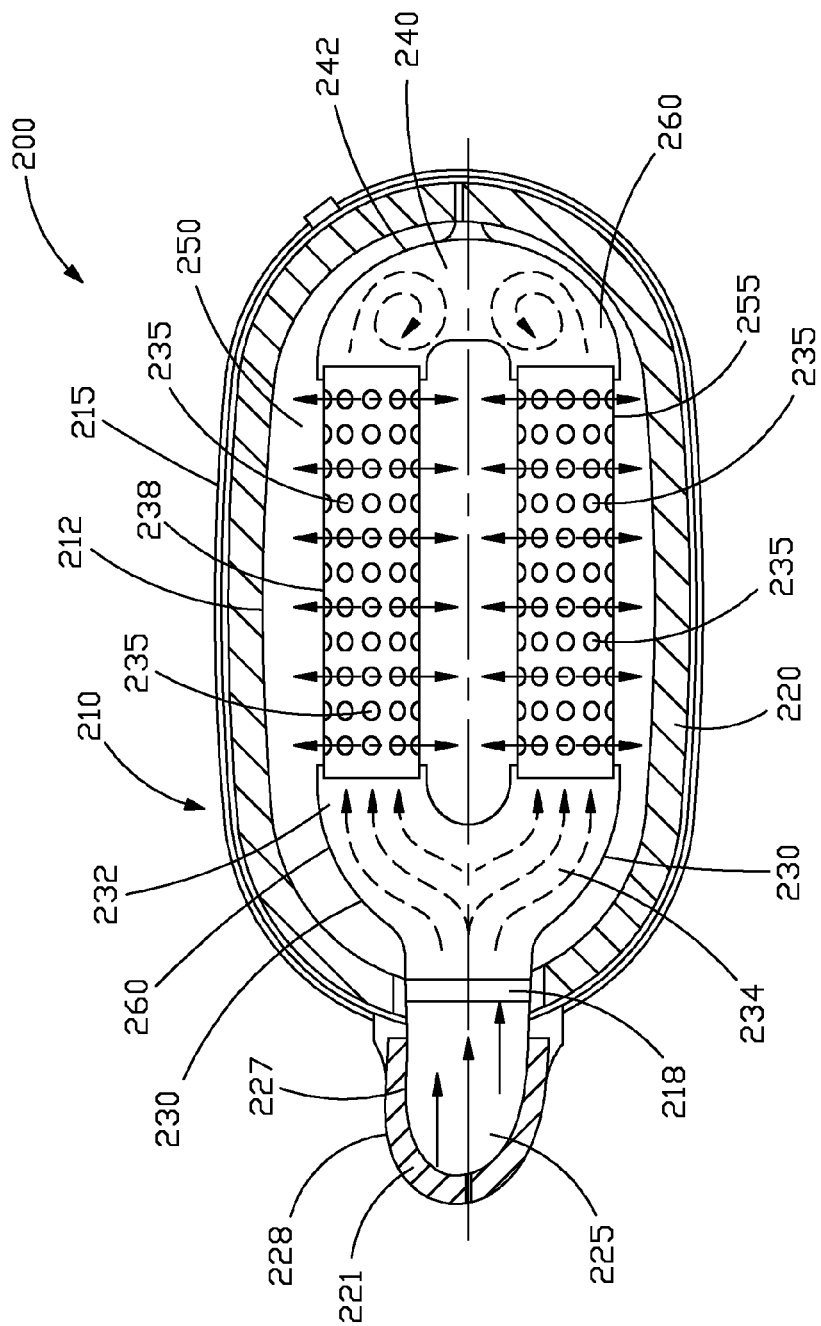
FIG. 3 is a cross-sectional view of a SCR muffler according to an embodiment of the invention.

FIG. 3 is a cross-sectional view of a SCR muffler according to an embodiment of the invention. As shown in FIG. 3, the SCR muffler 200 includes a housing 210, a side wall 212, an outer wall 215, an inlet 218, an inlet pipe 225, a mixing tube 230, a mixing chamber 250, and a mixing loop 260. The inlet pipe 225 fluidly connects an exhaust source (e.g., exhaust pre-treated with urea) (see FIG. 1) to the mixing loop 260 through the inlet 218. The mixing loop 260 extends from the inlet 218 into the mixing chamber 250. The side wall 212 defines a perimeter of the mixing chamber 250.

The mixing loop 260 includes the mixing tube 230 having a first branch 232 and a second branch 234 that converge at distal ends of the first and second branches 232 and 234 at an end section 240. Exhaust entering the mixing loop 250 can diverge at a proximal end of the mixing tube into the first branch 232 and the second branch 234 of the mixing tube 230, as generally shown by the arrows in FIG. 3. The first branch 232 and the second branch 234 of the mixing tube 230 have a plurality of apertures 235 defined in a wall 238 of the first branch 232 and a wall 255 of the second branch 234. In some embodiments, only one branch (e.g., the first branch 232) has apertures. Exhaust can flow from the mixing loop 260 into the mixing chamber 250 through the apertures 235, as generally shown by the arrows in FIG. 3.

The apertures 235 can be substantially the same size or can vary in size. In some embodiments, the apertures 235 are substantially evenly distributed on the wall 238 of the first branch 232 and/or the wall 255 of the second branch 234. In some embodiments, the apertures 235 are unevenly distributed on the wall 238 of the first branch 232 and/or the wall 255 of the second branch 234. In some embodiments, the apertures 235 are in the same or different configuration in the first branch 232 and the second branch 234. In some embodiments, the configuration of the apertures is selected to optimize the mixing of ammonia with the exhaust gases and/or the formation of ammonia from liquid, undecomposed urea. In some embodiments, the configuration of the apertures is selected to distribute the mixture substantially uniformly at the inlet of the substrates 120A and 120B.

As depicted in the embodiment shown in FIG. 3, the end section 240 is closed and does not include apertures. The lack of apertures in the end section 240 can promote the mixing of exhaust and ammonia and/or the formation of ammonia from liquid, undecomposed urea. For example, exhaust entering the closed end section 240 from the first branch 232 can collide with exhaust entering the closed end section 240 from the second branch 234. The collision of exhaust from the first branch 232 and second branch 234 can cause mixing, such as in a swirling flow, as generally depicted by the arrows in FIG. 3. The swirling flow can enhance the mixing of exhaust and ammonia and/or the formation of ammonia from liquid, undecomposed urea.

In some embodiments, the end section 240 can include a plurality of apertures (not shown) defined in a wall 242 of the end section 240. The apertures can be substantially the same size or can vary in size. In some embodiments, the apertures are substantially evenly distributed on the wall 242 of the end section 240. In some embodiments, the apertures are unevenly distributed on the wall 242 of the end section 240. In some embodiments, the configuration of the apertures is selected to optimize the mixing of ammonia with the exhaust gases and/or the formation of ammonia from liquid, undecomposed urea. In some embodiments, the configuration of the apertures is selected to optimize the distribution of gas across the substrate(s) (e.g., the substrates 120A and 120B depicted in FIG. 2).

In the illustrated embodiment, the mixing loop 260 has a substantially ovular shape. However, in other embodiments, the mixing loop 260 can be circular, rectangular, symmetric, asymmetric, or any other shape or configuration that creates a loop. In some embodiments, the mixing loop 260 can include three or more branches in any number of configurations. For example, the mixing loop 260 can have two branches that form an oval and a third branch that passes through the major or minor axis of the oval. In another example, the mixing loop 260 can have four branches that form an inner and outer oval, or, alternatively, an inner and outer circle. In some embodiments, the configuration of the mixing loop 260 is selected to optimize the mixing of ammonia with the exhaust gases and/or the formation of ammonia from liquid, undecomposed urea.

An insulating material 220 is optionally disposed between the side wall 212 and the outer wall 215 of the housing 210. An insulating material 221 is optionally disposed between an inner wall 227 and an outer wall 228 of the inlet pipe 225. The insulating material 220 and 221 can be the same or different materials and can be based on ceramic fiber materials (e.g., a vitreous aluminosilicate fiber such as CER-WOOL®, available from Thermal Ceramics Inc.).

Figure 4:
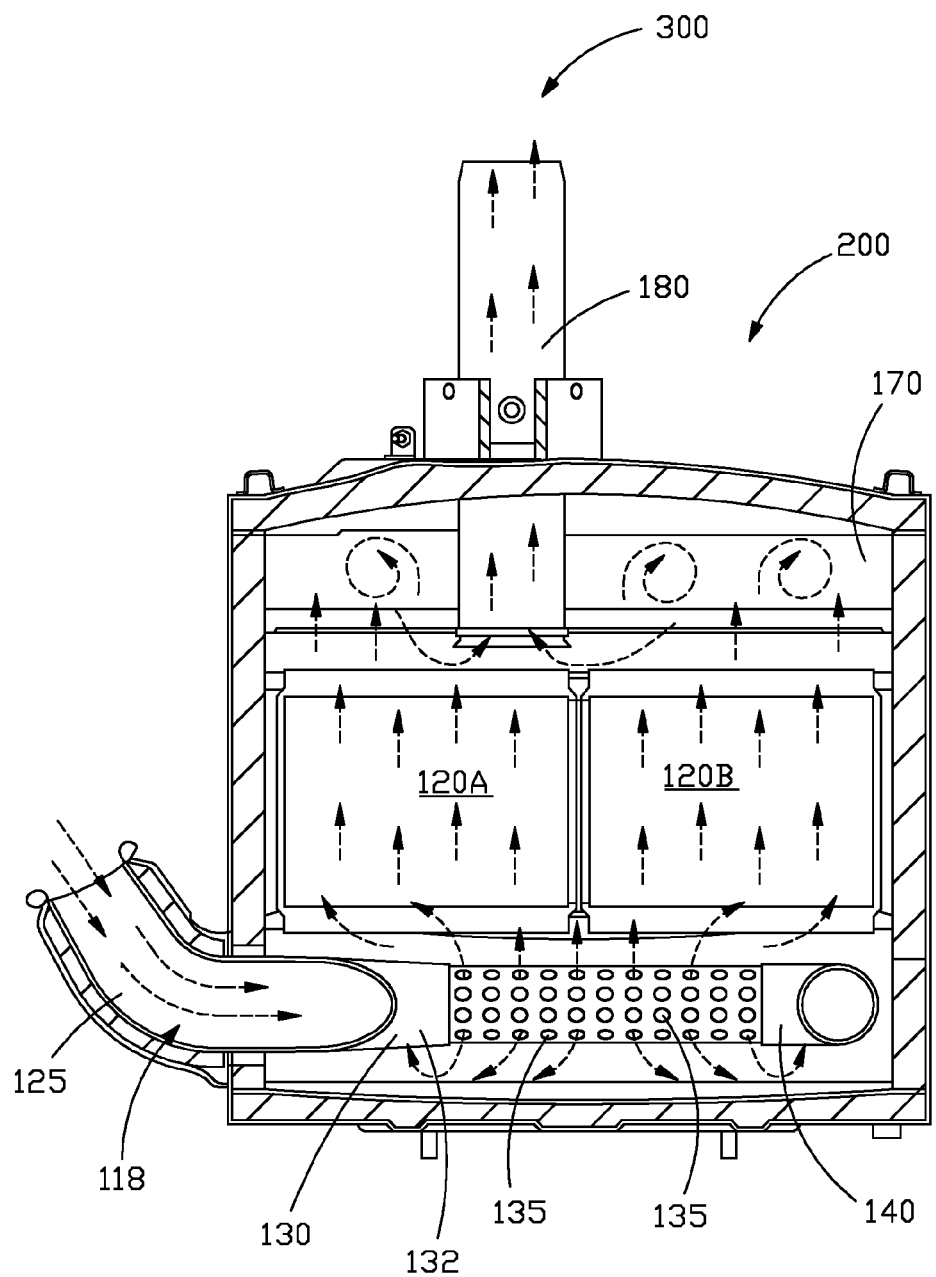
FIG. 4 is a cross-sectional view of a SCR muffler showing the flow of exhaust through the device.

With reference in FIG. 4, in operation, exhaust flows into the SCR muffler 200 after passing through an injector (e.g., the injector 30 in FIG. 1) to receive an atomized spray of urea. The exhaust includes a mixture of pollutants, including NOx, SOx, $CO_2$, and hydrocarbons, in addition to ammonia and liquid un-decomposed urea in the form of droplets. The exhaust flows from the inlet pipe 125 through the inlet 118 and into the mixing tube 130, which, in some embodiments, can form a mixing loop (e.g., the mixing loop 260 in FIG. 3). The inlet pipe 125 can be curved, causing the exhaust to flow at various angles and velocities as it enters the mixing tube 130. Inside the mixing tube 130, the exhaust diverges into the first branch 132 and the second branch (not shown) (e.g., the second branch 234 in FIG. 3). The exhaust in the first branch 132 collides and/or converges with the exhaust in the second branch at the end section 140. The collision and/or convergence of the exhaust from the first branch 132 and second branch can enhance urea evaporation and ammonia mixing with the exhaust gases. In some embodiments, the collision and/or convergence of the exhaust from the first branch 132 and second branch can equalize or substantially equalize the exhaust flow and/or pressure between the two branches, which can lead to a more uniform flow distribution at the inlets of the substrates 120A and 120B. In some embodiments, the collision and/or convergence creates turbulence in the mixing loop 260, which can result in better urea evaporation and ammonia mixing with the exhaust gases. The exhaust creates pressure in the mixing tube 130, forcing the mixed exhaust through the apertures 135 in the first branch 132 of the mixing tube 130 and/or through apertures in the second branch of the mixing tube 130 (see FIG. 3).

The apertures 135 and/or the apertures in the second branch (see FIG. 3) can create a substantially uniform distribution of mixed exhaust gas across the substrates 120A and 120B, as generally shown by the arrows in FIG. 4. The substantially uniform distribution of mixed exhaust can enhance the reactions between ammonia and NOx on the catalysts (i.e., the NOx reactions), thereby decreasing the concentration of NOx in the exhaust. After passing over the catalytic substrates, the exhaust enters the outlet chamber 170 and exits the SCR muffler 100 through the exhaust pipe 180 to vent to atmosphere 300, as generally shown by the arrows in FIG. 4.

In some embodiments, the exhaust in the first branch 132 is at a different pressure than the exhaust in the second branch (see FIG. 3). The pressure differential can be caused by the exhaust entering the mixing tube 130 at various angles and velocities, as described above. The end section 140 fluidly connects the first branch 132 and the second branch to from a mixing loop 260 and can minimize the pressure differential between the first branch 132 and the second branch. A minimal pressure differential can enhance the mixing and/or reacting between the exhaust from the first branch 132 and the second branch.

The apparatus described above can provide a more uniform distribution of exhaust gas and ammonia across a substrate (e.g., a catalyst). A more uniform distribution can enhance the reaction of pollutants (e.g., NOx) on the substrate, thereby decreasing the concentration of pollutants in the exhaust as it enters the atmosphere. For example, a more uniform distribution of exhaust gas and ammonia across a substrate can increase the conversion of NOx into harmless gases, such as nitrogen and water vapor.

Additionally, the apparatus described above can provide an increased production of ammonia from urea. A higher concentration of ammonia entering the substrate chamber can enhance the reaction of pollutants (e.g., NOx) on the substrate, thereby decreasing the concentration of pollutants in the exhaust as it enters the atmosphere. For example, a higher concentration of ammonia entering the substrate chamber can increase the reaction rate between NOx and ammonia (i.e., the NOx reactions).

Additionally, the apparatus described above can provide an increased mixing of exhaust gas and ammonia. A more uniformly mixed exhaust gas can enhance the reaction of pollutants (e.g., NOx) on the substrate, thereby decreasing the concentration of pollutants in the exhaust as it enters the atmosphere. For example, a more uniformly mixed exhaust gas entering the substrate chamber can increase the reaction rate between NOx and ammonia (i.e., the NOx reactions).

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed:

1. An apparatus for treating exhaust, comprising:
    a housing having a side wall, a top wall, and a bottom wall, the housing having an inlet and an outlet, the inlet in fluid communication with a source of exhaust gas;
    a mixing chamber in the housing in fluid communication with the inlet;
    a substrate chamber in the housing in fluid communication with the mixing chamber;
    an outlet chamber in the housing in fluid communication with the substrate chamber and the outlet; and
    a mixing loop comprising:
        a first branch having a first proximal end connected to the inlet and extending into the mixing chamber;
        a second branch having a second proximal end connected to the inlet and extending into the mixing chamber, wherein a plurality of apertures is defined in respective walls of the first branch and the second branch; and
        an end section extending between respective distal ends of the first branch and the second branch, wherein the end section is devoid of apertures and closed to block the exhaust gas from being expelled through the end section and into the mixing chamber, and wherein the end section is curved and forms a 180 degree turn.

2. The apparatus of claim 1 wherein the apertures are evenly distributed in the respective wall of the first branch and the second branch.

3. The apparatus of claim 1 wherein the apertures are unevenly distributed in the respective wall of the first branch and the second branch.

4. The apparatus of claim 1 wherein the apertures are the same size.

5. The apparatus of claim 1 wherein the apertures vary in size.

6. The apparatus of claim 1 wherein the mixing loop has a third branch connected to the inlet and extending into the mixing chamber.

7. The apparatus of claim 1 further comprising an exhaust pipe connected to the outlet of the housing, a portion of the exhaust pipe extending into the outlet chamber, wherein the portion of the exhaust pipe extending into the outlet chamber includes a plurality of apertures defined in a wall of the exhaust pipe.

8. The apparatus of claim 1 wherein the at least two branches and the end section of the mixing tube form a mixing loop.

9. The apparatus of claim 8 wherein the mixing loop is ovular.

10. The apparatus of claim 1, further comprising an inlet pipe connected to the inlet defined in the housing, the inlet pipe being in fluid communication with the mixing loop, wherein the inlet pipe and the mixing loop define a continuous flow path through the mixing chamber for the exhaust gas entering the housing via the inlet.

11. The apparatus claim 10, wherein the inlet pipe and the mixing loop are formed integrally.

12. An apparatus for treating exhaust comprising:
    a housing having an inlet and an outlet, the inlet in fluid communication with a source of exhaust, the housing defining a chamber;
    a mixing tube having at least two branches, wherein respective proximal ends of the at least two branches are connected to the inlet and a plurality of apertures is defined in respective walls of the at least two branches, distal ends of the at least two branches being connected by an end section, wherein the end section is curved and forms a 180 degree turn and the end section is devoid of apertures and closed to block the exhaust from being expelled through the end section; and
    a substrate disposed between the mixing tube and the outlet.

13. The apparatus of claim 12 wherein the apertures are evenly distributed in respective walls of the at least two branches.

14. The apparatus of claim 12 further comprising a mixing chamber in fluid communication with the inlet, the mixing tube extending into the mixing chamber.

15. An apparatus for treating exhaust, comprising:
    a housing having a side wall, a top wall, and a bottom wall, the housing having an inlet and an outlet, the inlet in fluid communication with a source of exhaust gas;
    a mixing chamber in the housing in fluid communication with the inlet;
    a substrate chamber in the housing in fluid communication with the mixing chamber;
    an outlet chamber in the housing in fluid communication with the substrate chamber and the outlet;
    an inlet pipe connected to the inlet defined in the housing, wherein a center line of the housing extends through the inlet pipe and the mixing chamber; and
    a mixing loop in fluid communication with the inlet pipe, wherein the mixing loop comprises a first branch having a first linear portion positioned on a first side of the center line and a second branch having a second linear portion positioned opposite the first linear portion on a second side of the center line wherein the first and second linear portions are parallel with respect to one another and are connected to the inlet pipe and extend into the mixing chamber, and wherein the mixing loop comprises an end section extending between respective distal ends of the first branch and the second branch, wherein respective walls of the first and second linear portions have a plurality of apertures, and the end section is devoid of apertures to block the exhaust gas from moving from the mixing tube into the mixing chamber at the end section, wherein the inlet pipe and the mixing loop define a continuous flow path through the mixing chamber for the exhaust gas entering the housing via the inlet.

16. The apparatus of claim 15, wherein the inlet pipe and the mixing loop are formed integrally.

17. The apparatus of claim 15, wherein the end section is curved and forms a 180 degree turn.

18. The apparatus of claim 17, wherein the mixing loop comprises a third branch extending into the mixing chamber along the center line.

\* \* \* \* \*